(12) United States Patent
Park et al.

(10) Patent No.: US 12,007,467 B2
(45) Date of Patent: Jun. 11, 2024

(54) DOPPLER-DIVISION MULTIPLEXING MIMO RADAR SIGNAL RECONSTRUCTION

(71) Applicant: Infineon Technologies AG, Neubiberg (DE)

(72) Inventors: Byung Kwon Park, Seongnam-Si (KR); Sang Ho Nam, Yongin-Si (KR)

(73) Assignee: Infineon Technologies AG, Neubiberg (DE)

( * ) Notice: Subject to any disclaimer, the term of this patent is extended or adjusted under 35 U.S.C. 154(b) by 282 days.

(21) Appl. No.: 17/510,780

(22) Filed: Oct. 26, 2021

(65) Prior Publication Data

US 2023/0129203 A1    Apr. 27, 2023

(51) Int. Cl.
| | |
|---|---|
| *G01S 13/524* | (2006.01) |
| *G01S 7/35* | (2006.01) |
| *G01S 13/32* | (2006.01) |
| *G01S 13/931* | (2020.01) |

(52) U.S. Cl.
CPC ............ *G01S 13/524* (2013.01); *G01S 7/356* (2021.05); *G01S 13/32* (2013.01); *G01S 13/931* (2013.01)

(58) Field of Classification Search
CPC .......... G01S 7/356; G01S 7/403; G01S 13/32; G01S 13/42; G01S 13/325; G01S 13/343; G01S 13/524; G01S 13/584; G01S 13/931
See application file for complete search history.

(56) References Cited

U.S. PATENT DOCUMENTS

| | | | | |
|---|---|---|---|---|
| 11,428,796 | B2* | 8/2022 | Nam | G01S 7/35 |
| 2005/0041754 | A1* | 2/2005 | Wu | H04L 27/364 |
| | | | | 375/295 |
| 2017/0026095 | A1* | 1/2017 | Ashrafi | H04B 7/10 |
| 2022/0099837 | A1* | 3/2022 | Crouch | G01S 17/931 |
| 2022/0171049 | A1* | 6/2022 | Wu | H04B 7/0413 |

FOREIGN PATENT DOCUMENTS

EP    3929622 A1 * 12/2021    ............ G01S 7/35

OTHER PUBLICATIONS

EP-3929622-A1.*

* cited by examiner

Primary Examiner — Vladimir Magloire
Assistant Examiner — Maxine McKenzie Phillips
(74) Attorney, Agent, or Firm — Banner & Witcoff Ltd.

(57) ABSTRACT

A multiple-input multiple-output (MIMO) radar system, including: a plurality of transmit channels configured to sequentially transmit signals with transmit-channel-designated Doppler division multiplexing (DDM) modulations; and processing circuitry configured to: determine, for each of the transmit channels, an impulse response of phase modulation errors due to DDM coupling of the respective transmit channel from each of the other transmit channels; and generate, based on the impulse response, a reconstruction matrix of modulation DDM coupling factors.

24 Claims, 14 Drawing Sheets

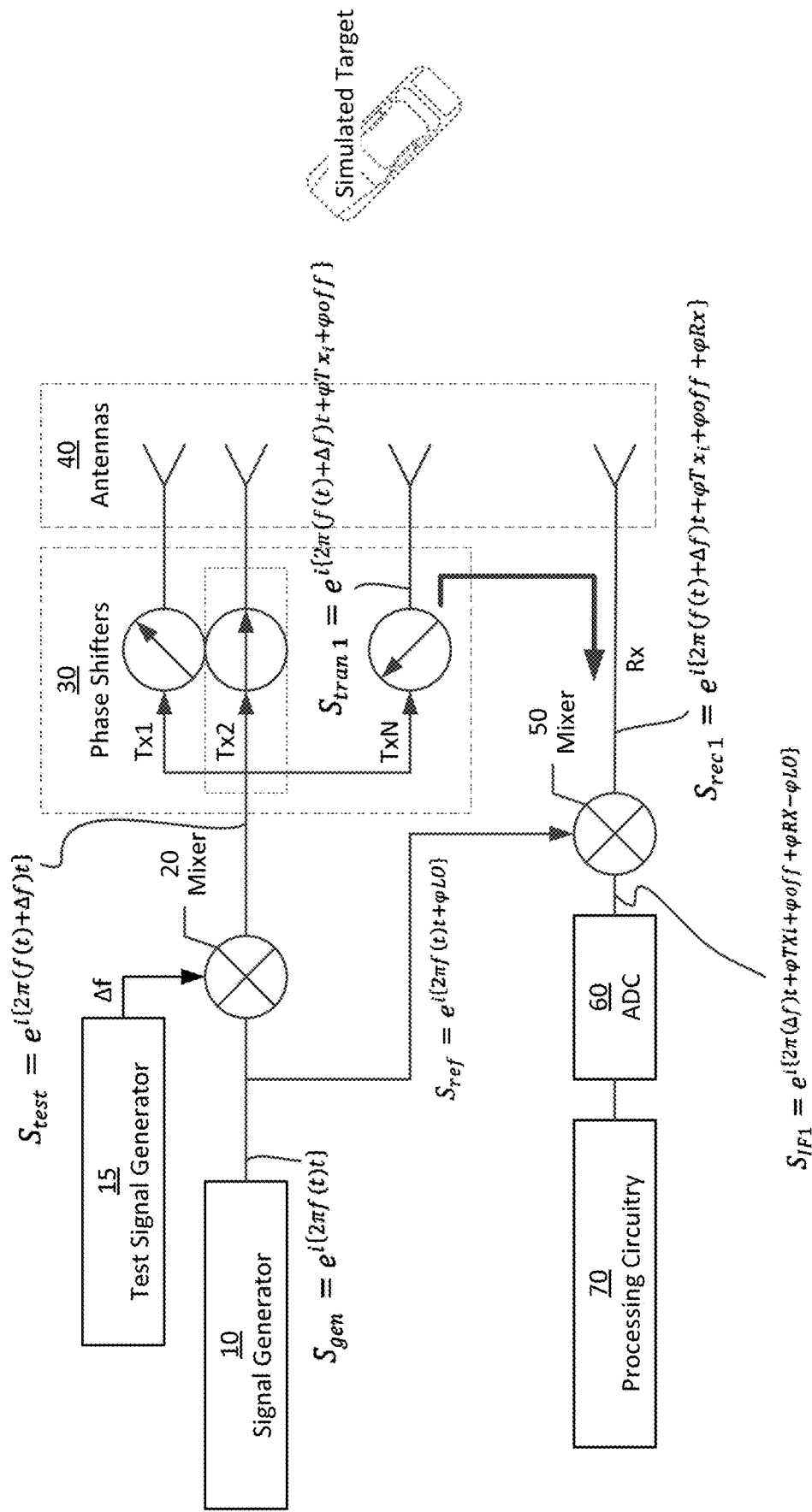

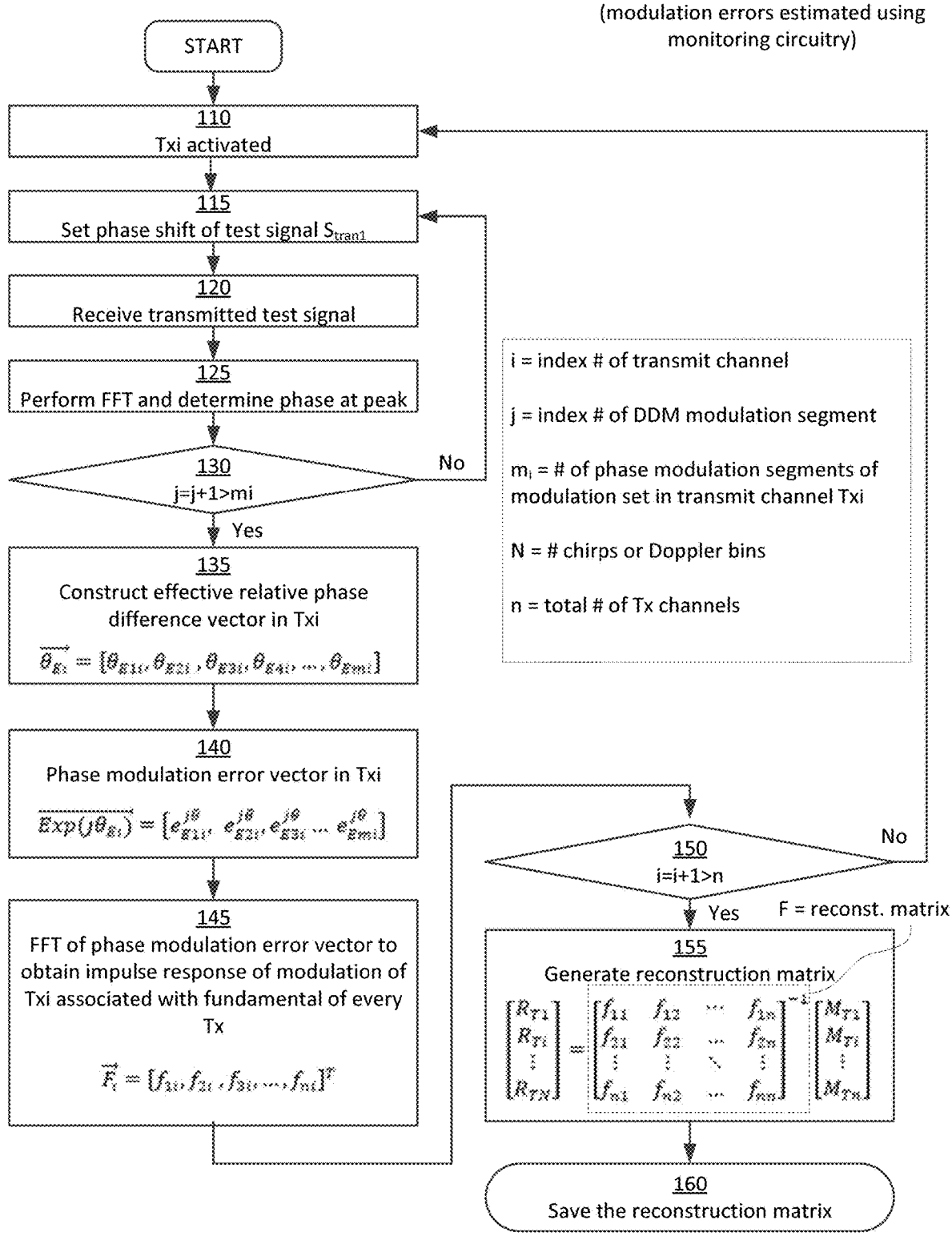

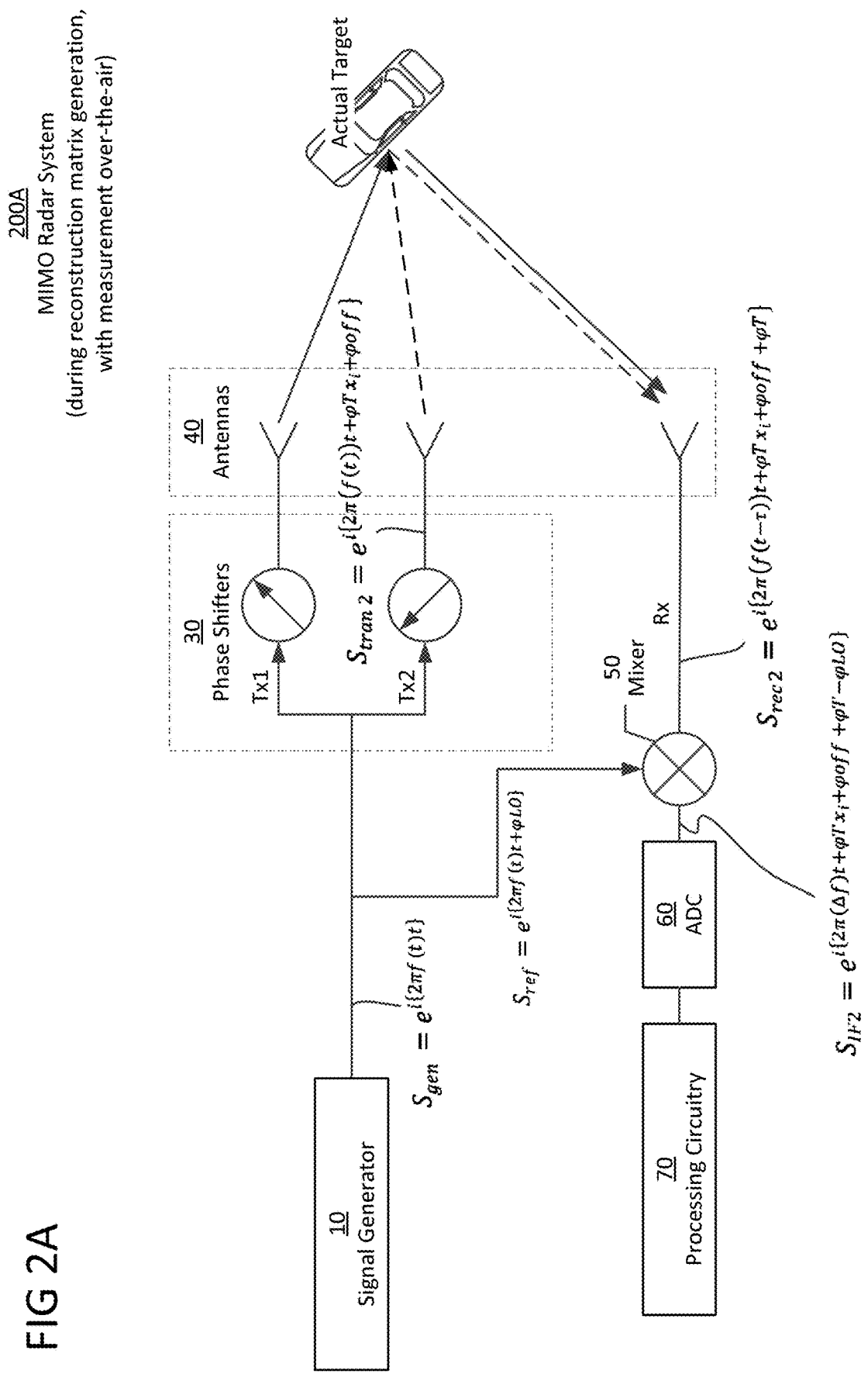

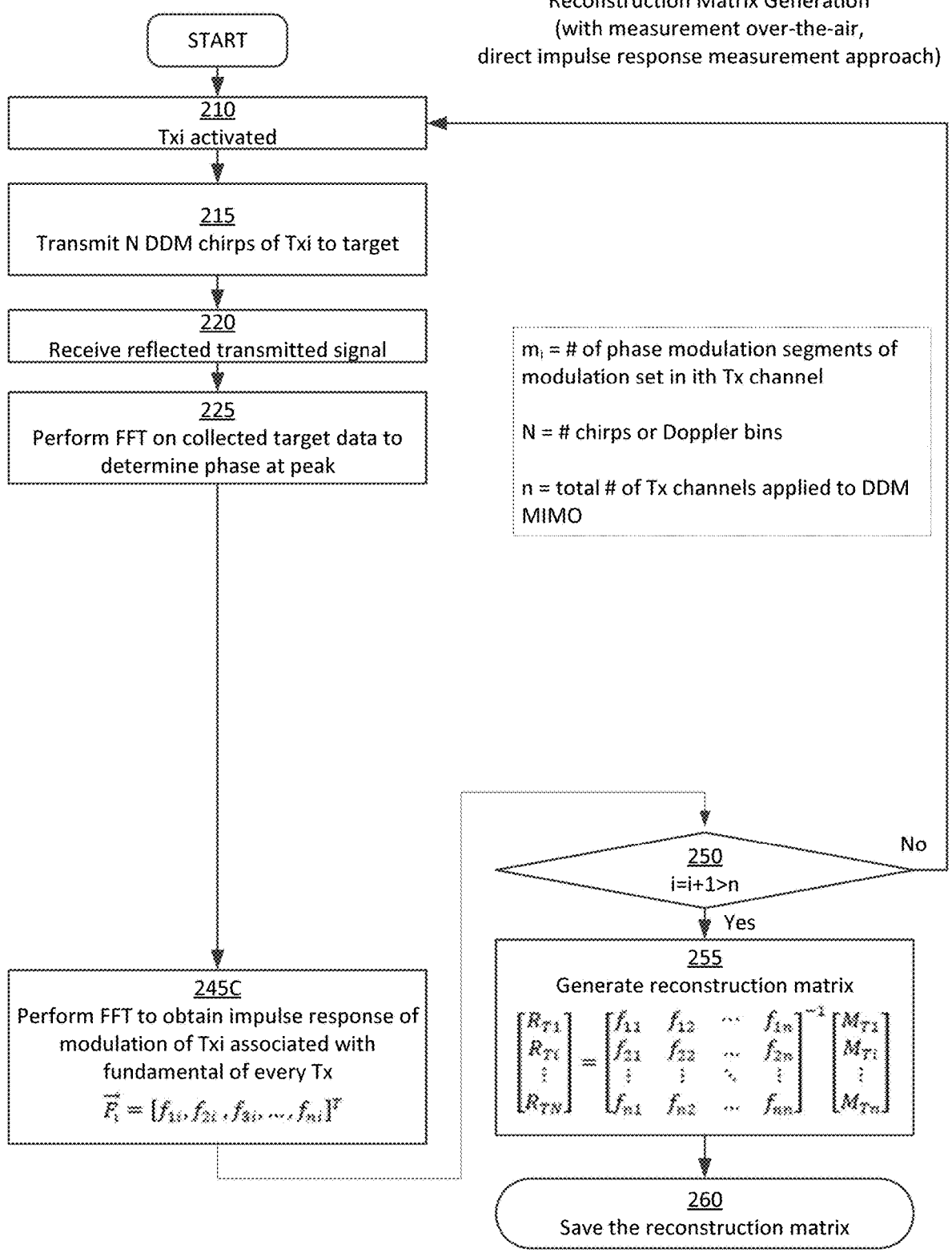

400A
Example Radar System with two Transmit Channels and One Receive Channel

400E
Reconstruction Matrix Generation

*Doppler spectrum distribution of BPSK wrt. modulation error, $\theta_{E180}$*

400B
Spectral Distribution of BPSK Modulation
<u>Ideal Case</u>, and Single Target at 0°

400C
Spectral Distribution of BPSK Modulation
With Initial Offset Phase, and Single Target at 0°

| | 1 | 2 | 3 | 4 | ... | 256 | offset errors |
|---|---|---|---|---|---|---|---|
| Tx1 | $\theta_{Tx1}$ | $\theta_{Tx1}$ | $\theta_{Tx1}$ | $\theta_{Tx1}$ | ... | $\theta_{Tx1}$ | $\theta_{T1}$:30° |
| Tx2 | $\theta_{Tx2}$ | $\theta_{Tx2}$+180 | $\theta_{Tx2}$ | $\theta_{Tx2}$+180 | ... | $\theta_{Tx2}$+180 | $\theta_{T2}$:60° |

Tx1: Non-modulation w/ initial phase of 30°

Tx2: BPSK-modulation w/ initial phase of 60°

Tx1 + Tx2

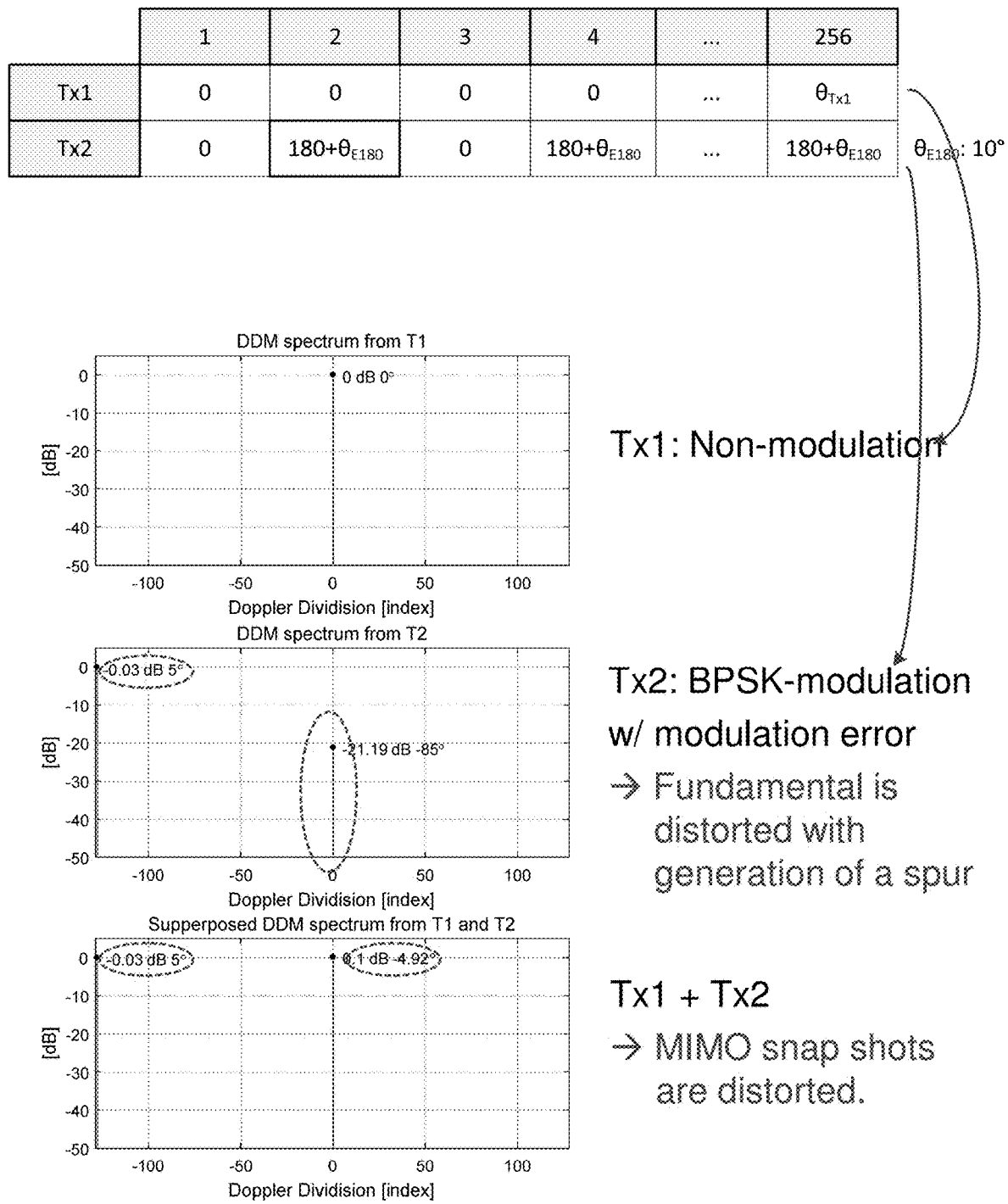

400G-1
Synthesized Virtual Array <u>After Reconstruction</u>

$\theta_{Tx1} = 0° / \theta_{Tx2} = 0° / \theta_{E180} = 0°$

☐ From Tx1
☐ From Tx2
● Compensated 400G-2
Synthesized Virtual Array <u>After Reconstruction</u>

$\theta_{Tx1} = 0° / \theta_{Tx2} = 0° / \theta_{E180} = 10°$ $\theta_{Tx1} = 0° / \theta_{Tx2} = 0° / \theta_{E180} = 20°$ ☐ From Tx1
☐ From Tx2
● Compensated

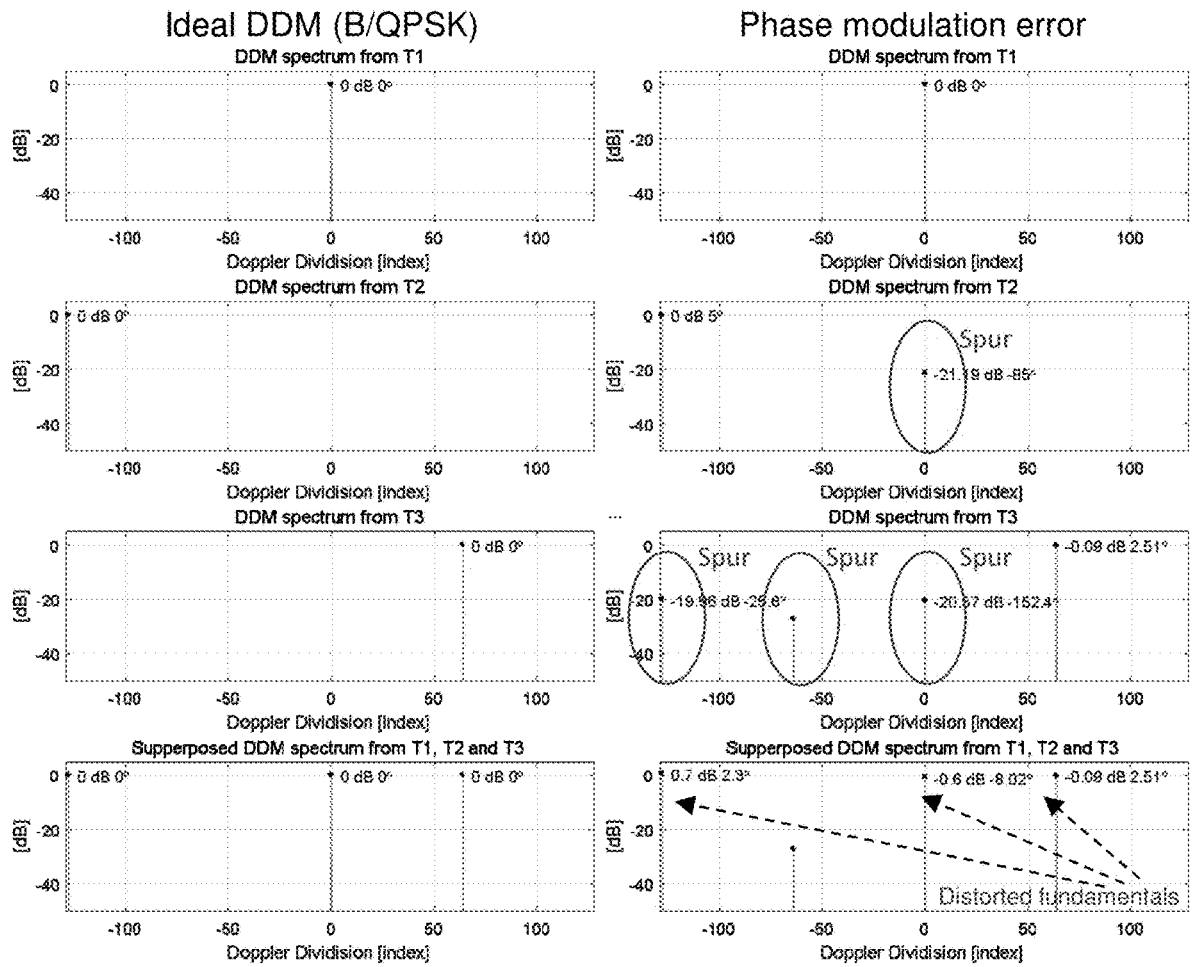

DOPPLER-DIVISION MULTIPLEXING MIMO RADAR SIGNAL RECONSTRUCTION

BACKGROUND

Radar sensors detect target distance, velocity, and angular position. In order to obtain high angular resolution, the radar beam width should be narrow, which generally requires a large number of receivers and antennas. This large number of receivers and antennas not only increases antenna aperture size, but also cost.

Multiple-input multiple-output (MIMO) technology may be implemented to enlarge the effective radar aperture size by synthesizing a virtual antenna array using a combination of multiple physical transmitters and/or multiple physical receivers. In order to synthesize a virtual antenna array from a physical antenna array, reflected signals received at each receive channel must be separated and identified for different transmit channels. This limitation may be mitigated by post-processing, which includes phase compensation, tracking, and the like. Such approaches add development and hardware cost.

Doppler-division multiplexing (DDM) MIMO may be used in advanced driver-assistance systems (ADAS) and vehicles having autonomous driving capabilities in order to achieve more accurate angular performance. However, due to practical limitations of a phase shifter's offset accuracy, phase modulation error results in angular performance degradation, as well as unwanted ghost targets in the range-distance spectrum.

FIG. 5A illustrates a table 500A of phase modulation in DDM frequency modulated continuous-wave (FMCW) radar, and FIG. 5B illustrates corresponding DDM waveforms. Fundamental signal components associated with concurrently-transmitting transmit channels Txs (T1, T2, T3) having different DDM modulations are separated in the Doppler spectrum. The ideal DDM waveforms with no phase modulation error, as illustrated in the left-hand column of FIG. 5B, have only one fundamental signal component per corresponding transmit channel Tx when demodulated in the Doppler domain. But the non-ideal DDM waveforms with phase modulation error, as illustrated in the right-hand column of FIG. 5B, results in amplitudes and phases of the fundamental signal components being distorted. Spurious signal components, which may appear at a same Doppler bin location of a fundamental signal component, become more significant as the number of modulation segments increases (and phase modulation steps decrease) such as from binary phase-shift keying (BPSK), to quadrature phase shift keying (QPSK), to 8PSK, to 16PSK, etc. The spurious components in the Doppler spectrum might overlap other transmit channel fundamental signal components used for synthesizing the MIMO virtual antenna array, resulting in distorted fundamental signal components, and thus degradation in angular performance.

BRIEF DESCRIPTION OF THE DRAWINGS

FIG. 2A illustrates a schematic diagram of a MIMO radar system during reconstruction matrix generation, with over-the-air modulation error measurement, in accordance with aspects of the disclosure.

FIG. 2C illustrates a flowchart of reconstruction matrix generation corresponding with FIG. 2A, using a direct impulse response measurement approach, in accordance with aspects of the disclosure.

FIGS. 4A-4G-2 illustrate an example of phase modulation error estimation/measurement and reconstruction matrix generation in accordance with aspects of the disclosure.

FIG. 5A illustrates a table of phase modulation in Doppler-division multiplexing (DDM) frequency-modulated continuous-wave (FMCW) radar.

FIG. 5B illustrates DDM waveforms corresponding with FIG. 5A.

DETAILED DESCRIPTION

This disclosure is directed to a multiple-input multiple-output (MIMO) frequency modulated continuous-wave (FMCW) radar system configured to compensate for DDM modulation error caused by inter-modulation coupling among MIMO transmit channels. The radar system is configured to generate a reconstruction matrix based on estimated/measured phase modulation error and corresponding impulse response. This reconstruction matrix may be applied to reflected transmit signals having DDM modulation error in order to reconstruct non-contaminated fundamental signal components out of fundamental signal components contaminated due to the inter-modulation coupling. A virtual antenna array may then be constructed without the inter-modulation coupling error. The accuracy of detected angular positions is thereby improved. And since the radar system performs the compensation in the digital domain, there is no additional cost of implementing high-accuracy phase shifters or an additional hardware feedback control loop for a time-consuming calibration process.

Figure 2B:
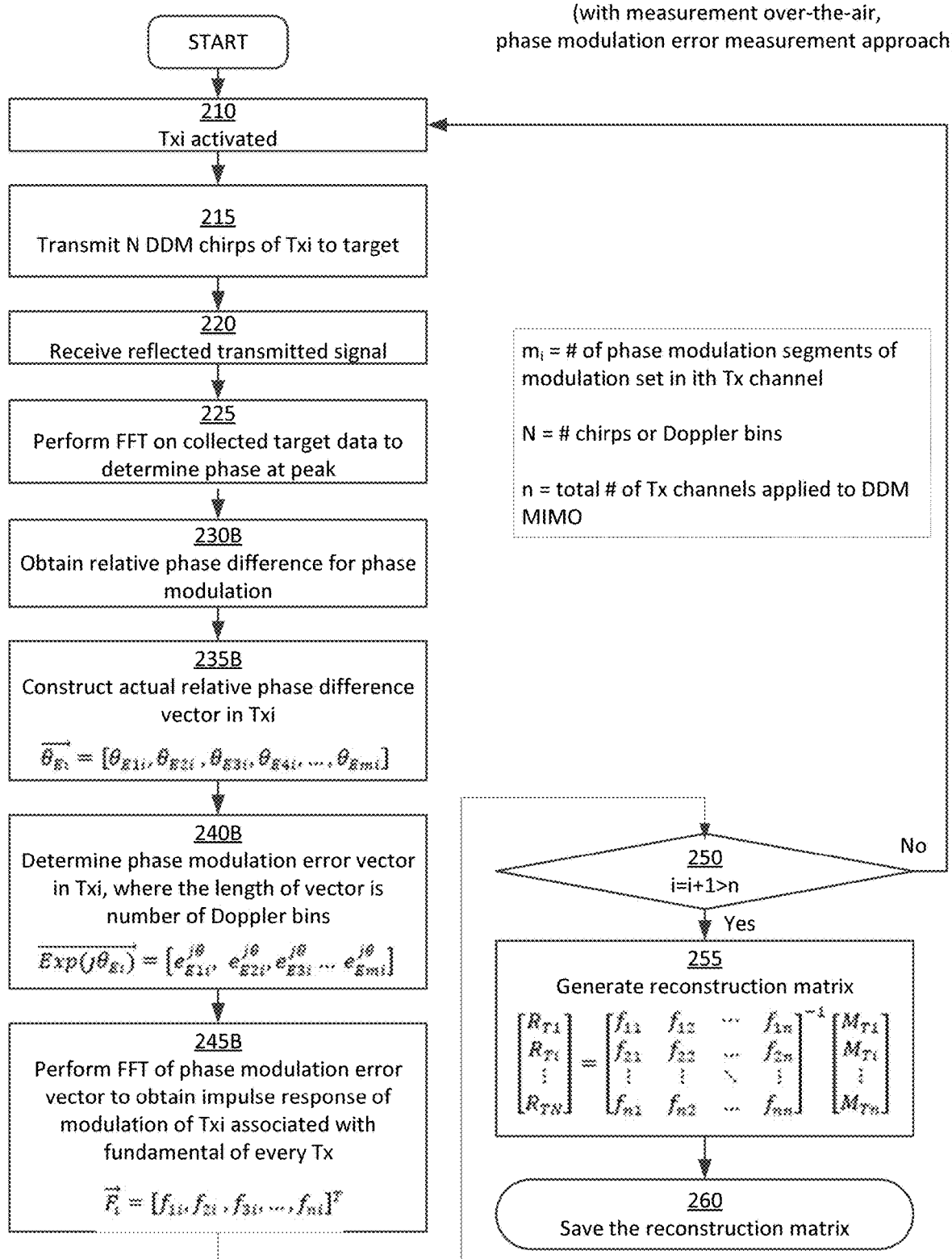
FIG. 2B illustrates a flowchart of reconstruction matrix generation corresponding with FIG. 2A, using a phase modulation error measurement approach, in accordance with aspects of the disclosure.
Figure 3:
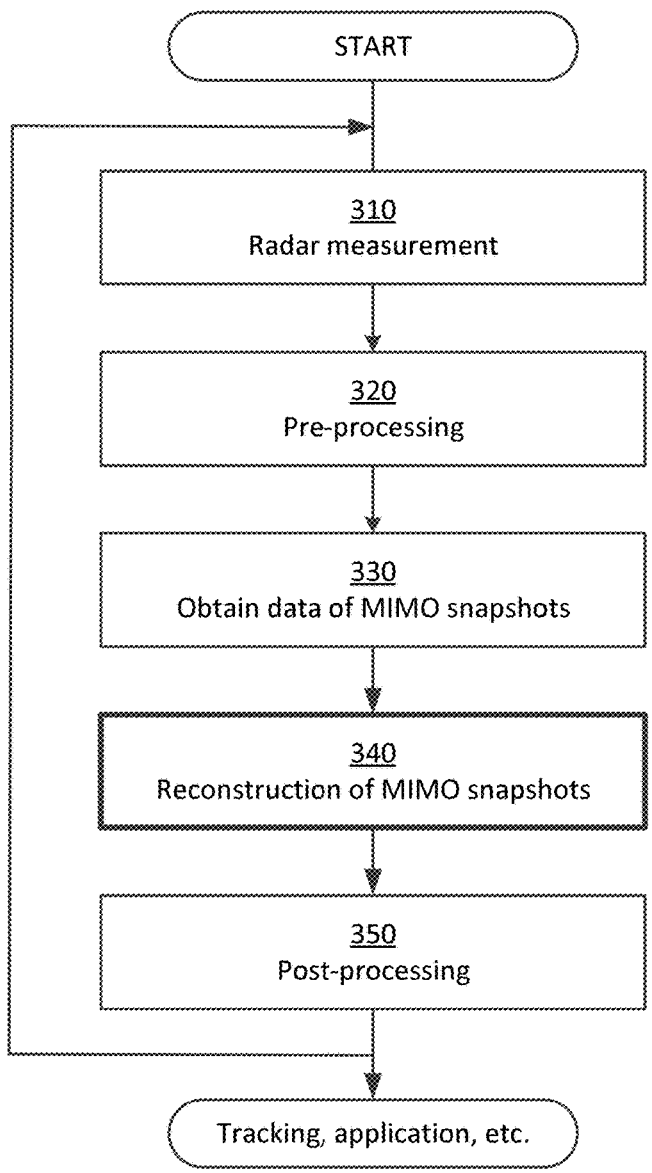
FIG. 3 illustrates a flowchart of signal reconstruction during a real-time radar operation in a MIMO radar system in accordance with aspects of the disclosure.

By way of overview, a reconstruction matrix is generated by: (1) activating transmit channels sequentially in designed DDM modulations; (2) receiving transmitted signals either through internal circuitry (FIGS. 1A-1B) or over-the-air after being reflected by a target (FIGS. 2A-2C); (3) estimating/measuring phase modulation error and determining a corresponding impulse response of modulation error using DFFT/FFT processing; and (4) determining, based on the phase modulation error and impulse response, a reconstruction matrix for the transmit channel DDM modulations. The reconstruction matrix may then be used in a real-time radar operation to synthesize a virtual antenna without inter-modulation coupling error (FIG. 3).

I. Generation of Reconstruction Matrix, With Estimation of Modulation Errors Using Monitoring Circuitry FIG. 1A illustrates a schematic diagram of a MIMO radar system 100A during generation of a reconstruction matrix, and FIG. 1B illustrates a corresponding flowchart 100B, in accordance with aspects of the disclosure. The MIMO radar system 100A is configured to generate the reconstruction matrix by estimating modulation errors using monitoring circuitry, as opposed to a MIMO radar system configured to measure modulation errors in over-the-air radar signals reflected from a target, as discussed below with respect to FIGS. 2A-2C.

A. Phase Modulation Error Estimation

The MIMO radar system 100A comprises a signal generator 10, a test signal generator 15, a first mixer 20, a plurality of transmit channels Txi (Tx1 . . . TxN), phase shifters 30 (e.g., I/Q modulators), antennas 40, a receive channel Rx, a second mixer 50, an analog-to-digital converter (ADC) 60, and processing circuitry 70. The number of transmit channels Tx and the number of receive channels Rx, in this example and throughout this disclosure, are not limited to any specific number of channels. Also, the terms "transmit channel" and "transmitter" are interchangeable, and similarly, the terms "receive channel" and "receiver" are interchangeable.

The signal generator 10 is configured to generate a generated signal $S_{gen}$. This generated signal $S_{gen}$ may be a single tone waveform (e.g., sine wave), or alternatively, a chirp waveform (e.g., FMCW signal including a set of chirps repeated a predetermined number of times) and is represented as:

$$S_{gen} = e^{i\{2\pi f(t)t\}}. \quad \text{(Equation 1)}$$

The first mixer 20 is configured to multiply this generated signal $S_{gen}$ by an offset frequency $\Delta f$ from the test signal generator 15 to shift the frequency of the generated signal $S_{gen}$, and output a test signal represented as:

$$S_{test} = e^{i\{2\pi(f(t)+\Delta f)t\}}. \quad \text{(Equation 2)}$$

The transmit channels Txi are activated one at a time, where i is an index number of a respective transmit channel Txi (Step 110). For example, the first transmit channel Tx1 is activated, while the non-Tx1 transmit channels (Tx2-TxN) are deactivated, followed by activation of a second transmit channel Tx2 while the non-Tx2 transmit channels are deactivated, and so on.

The phase shifters 30 of the respective transmit channels Txi are configured to phase-shift the test signal $S_{test}$ to sequentially emit transmit signals $S_{tran1}$ with transmit-channel-designated DDM modulations represented as:

$$S_{tran1} = e^{i\{2\pi(f(t)+\Delta f)t + \varphi_{Txi} + \varphi_{off}\}}, \quad \text{(Equation 3)}$$

where $\varphi_{Tx_i}$ represents a constant delay due to a length of circuitry of the respective transmit channel Txi, and $\varphi_{off}$ represents a shifted phase due to the respective phase shifter 30 (Step 115). (The "1" in "tran1" indicates that the transmit signal corresponds with the example of FIG. 1 as opposed to FIG. 2 discussed below.) Here, the first transmit channel Tx1 is unmodulated. The second transmit channel Tx2 may be modulated with binary phase shift keying (BPSK) modulation. A third transmit channel Tx3 may be modulated with quadrature phase shift keying (QPSK) modulation. Three transmit channels Txi and one receive channel Rx are used as an example, but any number of transmit channels and any number of receive channels may be used. Also, the specific modulations (i.e., BPSK, QPSK . . . ) are merely examples and not intended to be limiting.

The transmitted signal $S_{tran1}$ is received at the receive channel Rx as:

$$S_{rec1} = e^{i\{2\pi(f(t)+\Delta f)t + \varphi_{Txi} + \varphi_{off} + \varphi_{Rx}\}}, \quad \text{(Equation 4)}$$

(Step 120), where $\varphi_{RX}$ represents a constant delay due to a length of circuitry of the receive channel Rx.

The second mixer 50 is configured to down-convert the received signal $S_{rec1}$ with a reference signal $S_{ref}$. The reference signal may be, for example, based on the original non-phaseshifted, non-frequency shifted generated signal, and represented as:

$$S_{ref} = e^{i\{2\pi f(t)t + \varphi_{LO}\}}, \quad \text{(Equation 5)}$$

where $\varphi_{LO}$ represents a constant path delay. The received signal $S_{rec1}$ is thereby converted to an intermediate frequency (IF) signal represented as:

$$S_{IF1} = e^{i\{2\pi(\Delta f)t + \varphi_{Txi} + \varphi_{off} + \varphi_{Rx} - \varphi_{LO}\}}. \quad \text{(Equation 6)}$$

The IF signal $S_{IF1}$ is provided to the ADC 60 to be digitized into a set of target data samples. Signals associated with a particular transmit channel Txi in each receive signal $S_{rec1}$ may be separated by signal processing.

The processing circuitry 70 is configured to estimate phase modulation error by performing FFT processing on each set of target data samples received on each receive channel Rx, and determines the phase at the relative peak (Step 125). If the original generated signal $S_{gen}$ was a single tone signal, the processing circuitry 70 performs only one FFT processing over the fast time axis of the transmit signals $S_{tran1}$ coupled to a receive channel Rx to determine relative measured phase offsets of the transmit signals $S_{tran1}$. But if the original generated signal $S_{gen}$ was a FMCW signal, the processing circuitry 70 also performs an additional FFT processing over the slow time axis, that is, along the chirps in the FMCW waveform.

The index j of the respective phase offsets corresponding with the DDM segments is increased by one (Step 130). If it is not the case that j>m, where m is a total number of DDM segments of the modulation set in the respective transmit channel Txi (e.g., BPSK has two segments, QPSK has four segments . . . ), the process returns to Step 115 for transmission at the next phase modulation segment. Otherwise, the process continues to Step 135.

In actual operation the second transmit channel Tx2 may transmit up to N chirps (e.g., 256) and be DDM modulated by BPSK. During the reconstruction matrix generation, however, the phase offset error BPSK is determined for only two DDM segments, 0° and 180°. Even though there may be 256 chirps, 0° and 180° repeats (0°, 180°, 0°, 180° . . . ), so only two DDM segments need to be checked for intermodulation coupling phase error due to the phase shifter 30 because the phase shift errors will repeat. Similarly, with QPSK, only four DDM segments need be checked (0°, 90°, 180°, 270°).

At Step 135, the processing circuitry 70 is configured to normalize the phase offsets by constructing an effective relative phase difference vector of DDM segments in the respective transmit channels Txi represented as:

$$\vec{\theta}_{Ei} = [\theta_{E1i}, \theta_{E2i}, \theta_{E3i}, \theta_{E4i}, \ldots, \theta_{Emi}], \quad \text{(Equation 7)}$$

where the length of vector $\vec{\theta}_{Ei}$ is N, which is the number of chirps or Doppler bins.

The processing circuitry 70 is further configured to estimate, based on the effective relative phase difference vector $\vec{\theta}_{Ei}$ (Equation 7), a phase modulation error vector for each of the transmit channels Txi due to the DDM coupling of the respective transmit channel Txi from each of the other transmit channels Txi (Step 140), wherein the phase modulation error vector represented as:

$$\overrightarrow{Exp(j\theta_{Ei})} = [e_{E1i}{}^{j\theta}, e_{E2i}{}^{j\theta}, e_{E3i}{}^{j\theta} \ldots e_{Emi}{}^{j\theta}] \quad \text{(Equation 8)}$$

The processing circuitry 70 is configured to estimate, for each of the transmit channels Txi, an impulse response of phase modulation errors due to DDM coupling of the respective transmit channel Txi from each of the other transmit channels Txi. The processing circuitry 70 performs this estimation by performing FFT processing of the phase modulation vector $\overrightarrow{Exp(j\theta_{Ei})}$ (Equation 8). The impulse response of the fundamental component signal of every transmit channel Txi represented as:

$$\overrightarrow{F_i} = [f_{1i}, f_{2i}, f_{3i}, \ldots, f_{ni}]^T, \quad \text{(Equation 9)}$$

where $\overrightarrow{F_i}$ represents a coupling vector including all of the coupling factors of spurs from the other transmit channels Tx on the fundamental of the respective transmit channel Txi (Step 145).

The index number i of the transmit channels Txi is increased by one (Step 150). If it is not the case that i>n, where n is a total number of transmit channels Tx, the process returns to Step 110 to activate the next transmit channel Txi. Otherwise, the process continues to Step 155.

B. Reconstruction Matrix Generation

The processing circuitry 70 is further configured to generate, based on the impulse response of phase modulation errors, a reconstruction matrix RM of modulation DDM coupling factors $f_{nn}$ for every Tx modulation (Step 155). The reconstruction matrix RM is saved in a memory (Step 160).

II. Generation of Reconstruction Matrix, With Estimation of Modulation Errors Using Over-the-Air Measurement FIG. 2A illustrates a schematic diagram of a MIMO radar system 200A during generation of a reconstruction matrix in accordance with aspects of the disclosure. The MIMO radar system 200A is configured to measure modulation errors in a transmitted signal that is reflected off of a target and received over-the-air, as opposed to using monitoring circuitry to estimate modulation errors, as discussed above with respect to FIGS. 1A-1B. FIGS. 2B and 2C illustrate alternative corresponding flowcharts 200B, 200C of this reconstruction matrix generation in accordance with aspects of the disclosure, with FIG. 2B illustrating a flowchart 200B using a phase modulation error measurement approach, and FIG. 2C illustrating a flowchart 200C using a direct impulse response measurement approach.

A. Phase Modulation Error

The MIMO radar system 200A may be the same as the MIMO radar system 200A discussed above with respect to FIG. 1A, except that the test signal generator 15 is not used to offset the frequency of the generated signal $S_{gen}$, and a radar signal is transmitted towards a target in order to measure phase modulation error.

The signal generator 10 is configured to generate an FWCW signal represented as follows:

$$S_{gen} = e^{i\{2\pi f(t)t\}}. \quad \text{(Equation 11)}$$

The plurality of transmit channels Txi are configured to be sequentially activated one at a time, and the plurality of phase shifters 30 of the respective transmit channels Txi are configured to phase-shift the generated signal $S_{gen}$ to sequentially transmit from each of the transmit channels Txi N transmit-channel-designated DDM modulation chirps towards the actual target, with the transmitted signal $S_{tran2}$ represented as:

$$S_{tran2} = e^{i\{2\pi (f(t))t + \varphi Txi + \varphi off\}} \quad \text{(Equation 12)}$$

(Steps 210 and 215). For example, a first transmit channel Tx1 is activated while the non-Tx1 transmit channels (Tx2-TxN) are deactivated, followed by activation of a second transmit channel Tx2 with deactivation of the non-Tx2 transmit channels, and so on. Two transmit channels Txi and one receive channel Rx are used as an example, but any number of transmit channels and any number of receive channels may be used. Also, the specific modulation (e.g., BPSK) is not intended to be limiting.

The receive channel Rx receives a combined signal of the transmitted signals from both transmit channels Tx1 and Tx2 after being reflected off of the target (Step 220), with the received signal represented as:

$$S_{rec2} = e^{i\{2\pi (f(t-\tau))t + \varphi Txi + \varphi off + \varphi T\}} \quad \text{(Equation 13)}$$

The received signal $S_{rec2}$ is multiplied by the second mixer 50 with a reference signal, which may be the original non-phase shifted signal represented as:

$$S_{ref} = e^{i\{2\pi f(t)t + \varphi LO\}} \quad \text{(Equation 14)}$$

to down-convert the received signal $S_{rec2}$ to an IF signal represented as:

$$S_{IF2} = e^{i\{2\pi (\Delta f)t + \varphi Txi + \varphi off + \varphi T - \varphi LO\}}. \quad \text{(Equation 15)}$$

The IF signal $S_{IF2}$ is provided to the ADC 60 to be digitized into a set of target data samples. Signals associated with a particular transmit channel Txi in each receive signal $S_{rec2}$ may be separated by signal processing.

The processing circuitry 70 is configured to determine phase at a peak by performing a first FFT processing on the set of target data samples received on each receive channel Rx in the digital domain (Step 225).

1. Phase Modulation Error Measurement Approach of FIG. 2B

The processing circuitry 70 is configured to obtain a relative phase difference for phase modulation (Step 230B), and construct, for the respective transmit channels Txi, an actual relative phase difference vector represented as:

$$\overrightarrow{\theta_{Ei}} = [\theta_{E1i}, \theta_{E2i}, \theta_{E3i}, \theta_{E4i}, \ldots, \theta_{Emi}], \quad \text{(Equation 16)}$$

where $m_i$ represents the number of phase modulation segments of the modulation set in the respective transmit channel Txi (Step 235B). The length of $\overrightarrow{\theta_{Ei}}$ is N, which is the number of chirps.

The processing circuitry 70 is further configured to determine a phase modulation error vector in each transmit channel Txi due to the DDM coupling of the respective transmit channel Txi from each of the other transmit channels Txi (Step 240B), with the phase modulation error vector represented as:

$$\overrightarrow{Exp(j\theta_{Ei})} = [e_{E1i}{}^{j\theta}, e_{E2i}{}^{j\theta}, e_{E3i}{}^{j\theta} \ldots e_{Emi}{}^{j\theta}]. \quad \text{(Equation 17)}$$

The length of this vector is the number of Doppler bins.

As discussed above for Step 145 shown in FIG. 1B, the processing circuitry 70 is further configured to determine an impulse response of the phase modulation error by performing FFT processing on the phase modulation vector $\overrightarrow{Exp(j\theta_{Ei})}$ (Equation 17) for each of the respective transmit channels Txi to obtain an impulse response of modulation of each transmit channel Txi associated with the fundamental component signal of every transmit channel Txi represented as:

$$\vec{F_i} = [f_{1i}, f_{2i}, f_{3i}, \ldots, f_{ni}]^T, \quad \text{(Equation 18)}$$

where $\vec{Fi}$ represents a coupling vector including all of the coupling factors of spurs from the other transmit channels Tx on the fundamental of the $i^{th}$ transmit channel Txi (Step 245B).

The index number i of the transmit channels Txi is increased by one (Step 250). If it is not the case that i>n, where n is a total number of transmit channels Tx, the process returns to Step 210 to activate the next transmit channel Txi. Otherwise, the process continues to Step 255.

2. Direct Impulse Response Measurement Approach of FIG. 2C

The direct impulse response measurement approach of FIG. 2C is an alternative to the phase modulation error measurement approach of FIG. 2B. In particular, Step 245C of FIG. 2C replaces Steps 230B-245B of FIG. 2B. Rather than the processing circuitry 70 being configured to obtain relative phase differences (Step 230B), construct actual relative phase difference vectors (Step 235B), determine phase modulation error vectors (Step 240B), and perform FFT on the phase modulation error vectors (Step 245B) as discussed above with respect to FIG. 2B, the processing circuitry 70 is instead configured to simply determine the impulse response for each of the transmit channels Txi by performing FFT processing over a slow time axis of the transmit signals reflected by the target, and generate the reconstruction matrix based on the result of this FFT processing. More specifically, the processing circuitry 70 is configured to perform a second FFT processing to obtain an impulse response of modulation of each transmit channel Txi associated with the fundamental component signal of every transmit channel Txi:

$$\vec{F_i} = [f_{1i}, f_{2i}, f_{3i}, \ldots, f_{ni}]^T, \quad \text{(Equation 19)}$$

where $\vec{Fi}$ represents a coupling vector including all of the coupling factors of spurs from the other transmit channels Tx on the fundamental of the respective transmit channel Txi (Step 245C).

C. Reconstruction Matrix Derivation

As discussed above for Step 155 in FIG. 1B, the processing circuitry 70 is configured to generate a reconstruction matrix RM for every Tx modulation (Step 255). For further details see above description for Step 155. And the reconstruction matrix is saved in memory (Step 260).

III. Signal Reconstruction

FIG. 3 illustrates a flowchart 300 of signal reconstruction during a real-time radar operation in a MIMO radar system 100A, 200A after determining the reconstruction matrix as described above in accordance with aspects of the disclosure is known. The signal reconstruction may be performed by a microcontroller, for example.

At Step 310, the MIMO radar system 100A, 200A performs a radar measurement. More specifically, a FMCW signal is forwarded to a plurality of transmit channels Tx1 . . . TxN to be transmitted over a plurality of antennas 40 simultaneously with predefined DDM phase configurations, to one or more receive channels Rx for processing of the FMCW signal received after being reflected off of a target.

At Step 320, the processing circuitry 70 performs known pre-processing steps. More specifically, after time data is acquired for each receive channel Rx, the processing circuitry 70 performs FFT processing non-cooperative identification (NCI), thresholding, peak detection, etc.

At Step 330, the processing circuitry 70 obtains data of MIMO snapshots of fundamental signal components associated with each transmit channel Txi for each receive channel Rx to result in a matrix $M_{Ti}$ of measured fundamental signals which may have inter-modulation coupling due to a phase offset from imperfect phase shifters 30.

At Step 340, the MIMO snapshots are reconstructed by the reconstruction matrix RM being applied to the MIMO snapshots for each receive channel Rx to restore fundamental signal components from the measured fundamental signal components contaminated due to the inter-modulation coupling. More specifically, the processing circuitry 70 is further configured to multiply this reconstruction matrix RM by a measured matrix $M_{Ti}$, wherein the measured matrix $M_{Ti}$ comprises measured fundamental signal components superposed by spurious components due to DDM modulation coupling between the transmit channels Tx. The result is a real matrix $R_{Ti}$ of reconstructed fundamental signal components associated with the respective transmit channels Txi represented as:

$$\begin{bmatrix} R_{T1} \\ R_{Ti} \\ \vdots \\ R_{TN} \end{bmatrix} = \begin{bmatrix} f_{11} & f_{12} & \cdots & f_{1n} \\ f_{21} & f_{22} & \cdots & f_{2n} \\ \vdots & \vdots & \ddots & \vdots \\ f_{n1} & f_{n2} & \cdots & f_{nn} \end{bmatrix}^{-1} \begin{bmatrix} M_{T1} \\ M_{Ti} \\ \vdots \\ M_{Tn} \end{bmatrix}, \quad \text{(Equation 20)}$$

wherein fnn in the reconstruction matrix RM represents coupling factors on the fundamental signal of the respective transmit channel Txi by a corresponding spur from an $n^{th}$ transmit channel Txj.

The processing circuitry 70 may then be configured to synthesize an error-free MIMO virtual array using the matrix $R_{Ti}$ of reconstructed fundamental signals, without the inter-modulation coupling error distorting the fundamental signal components. It should be appreciated that the MIMO radar systems of this disclosure may be used to reconstruct MIMO snap shots of not only a single target, but of multiple targets simultaneously.

At Step 350, the processing circuitry 70 performs known post-processing steps, which may include direction of arrival, etc.

Finally, the process may return to Step 310 to be repeated, or alternatively, proceed with standard target tracking, etc.

IV. Example of Reconstruction Matrix Generation/Estimation and Reconstruction Matrix Generation FIGS. 4A-4G illustrate an example of phase modulation error estimation/measurement and reconstruction matrix generation in accordance with aspects of the disclosure.

Figure 4A:
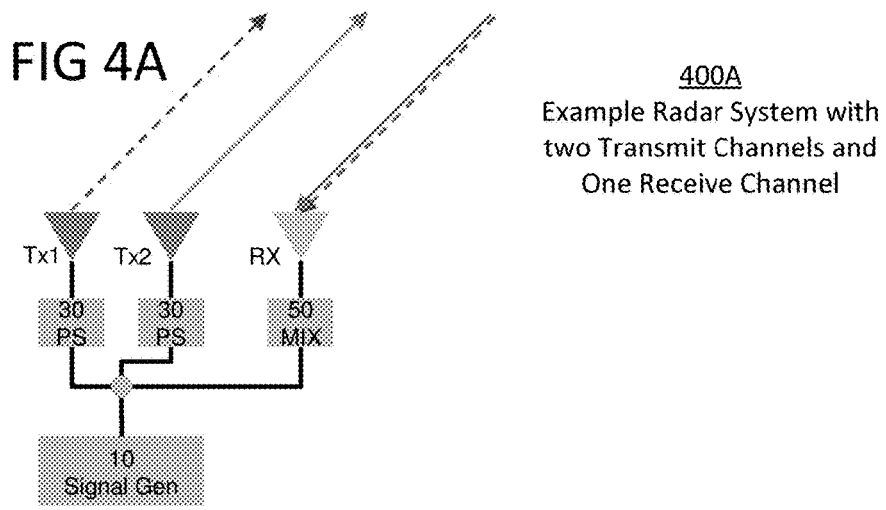

FIG. 4A illustrates a radar system 400A with two transmit channels Tx1, Tx2 and one receive channel Rx using BPSK modulation. In this example, the first transmit channel Tx1 is unmodulated. The second transmit channel Tx2 is BPSK modulated with 0° and 180°. During operation the transmit channels Tx1 and Tx2 emit transmit signals concurrently. Each transmit signal is reflected from a target, and these reflected signals are received by the receive channel Rx as superposed signals. The processing circuitry 70 performs Doppler FFT, to shift the signal from the second transmit channel Tx2 to separate the reflected signals transmitted by the first and second transmit channels Tx1 and Tx2. However, due to imperfection of a phase shifter 30 causing a phase modulation error in the BPSK modulation, a spurious component is induced by non-ideal BPSK modulation from the second transmit channel Tx2 and located at the same Doppler bin of the fundamental signal components of the first transmit channel Tx1, consequently distorting the first transmit channel's Tx1 fundamental signal component. This distortion is addressed as follows.

Figure 4E:
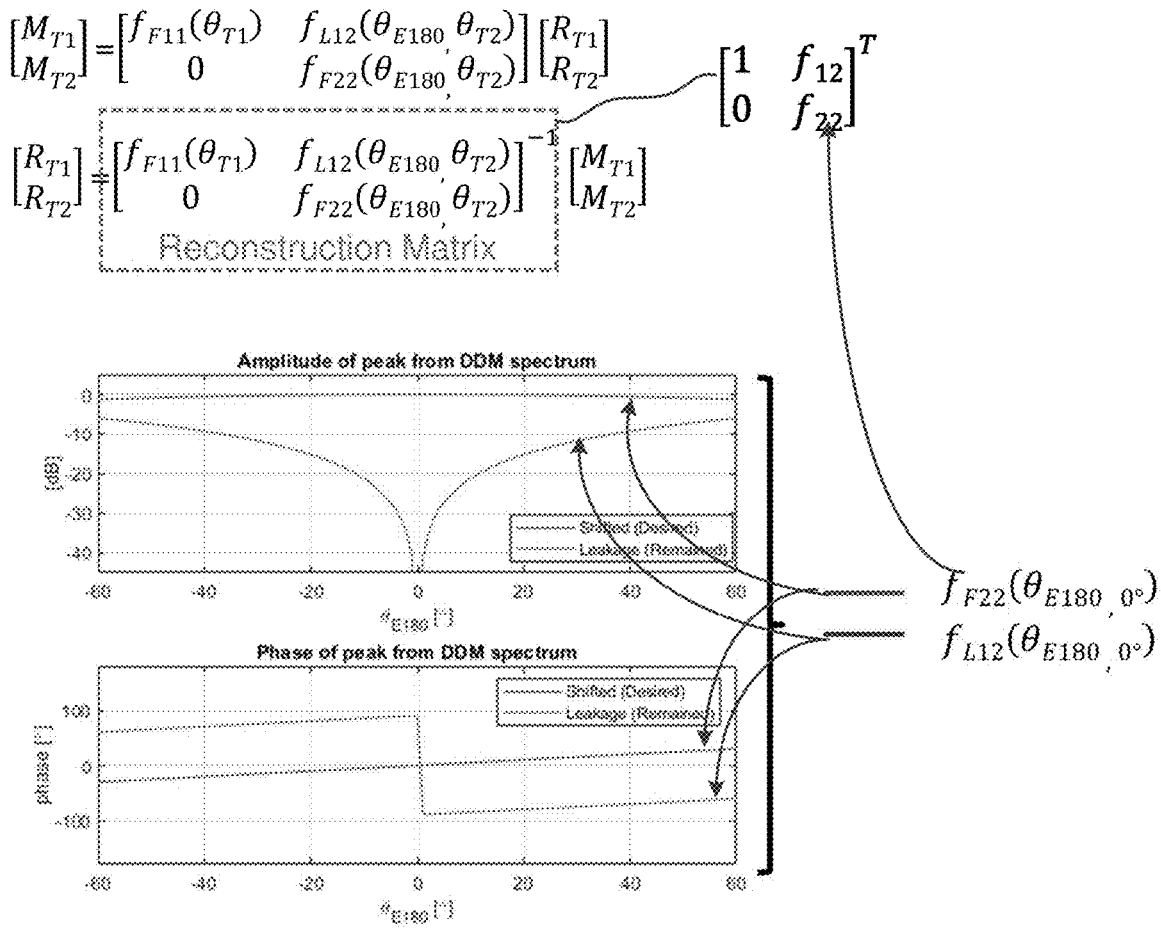
Figure 4B:
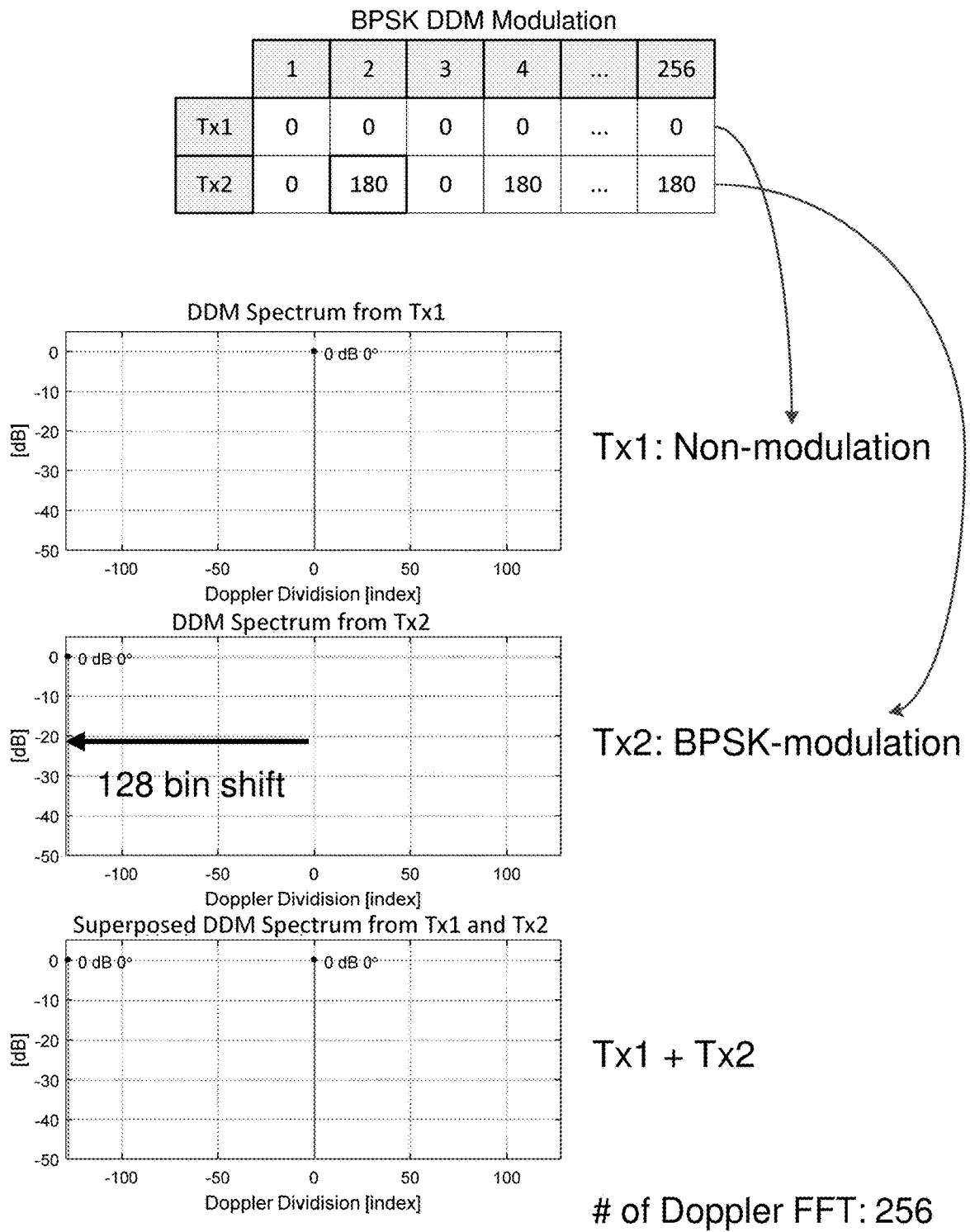

FIG. 4B illustrates a spectral distribution 400B of BPSK modulation in an ideal case, with a single target located at 0°. Since the first transmit channel Tx1 has no modulation, the first transmit channel Tx1 does not need to be verified. However, the second transmit channel Tx2 has BPSK modulation (0° and 180°), and its phase shifter 30 at both 0° and 180° phase shift needs to be verified. The phase shifter 30 of the second transmit channel Tx2 is first set to 0°, and the second transmit channel Tx2 is activated to emit a corresponding transmit signal $S_{tran}$. The phase shifter 30 of the second transmit channel Tx2 is subsequently set to 180°, and the second transmit channel Tx2 is activated to emit a corresponding transmit signal $S_{tran}$. The frequency bins associated with the reflecting (or simulated) target are convoluted with the impulse response of designed DDM modulation as shown. Due to the distance between the impulses from the different phase modulations, the received signals associated with different transmission channels Tx1, Tx2 can be separated in Doppler range.

Figure 4C:
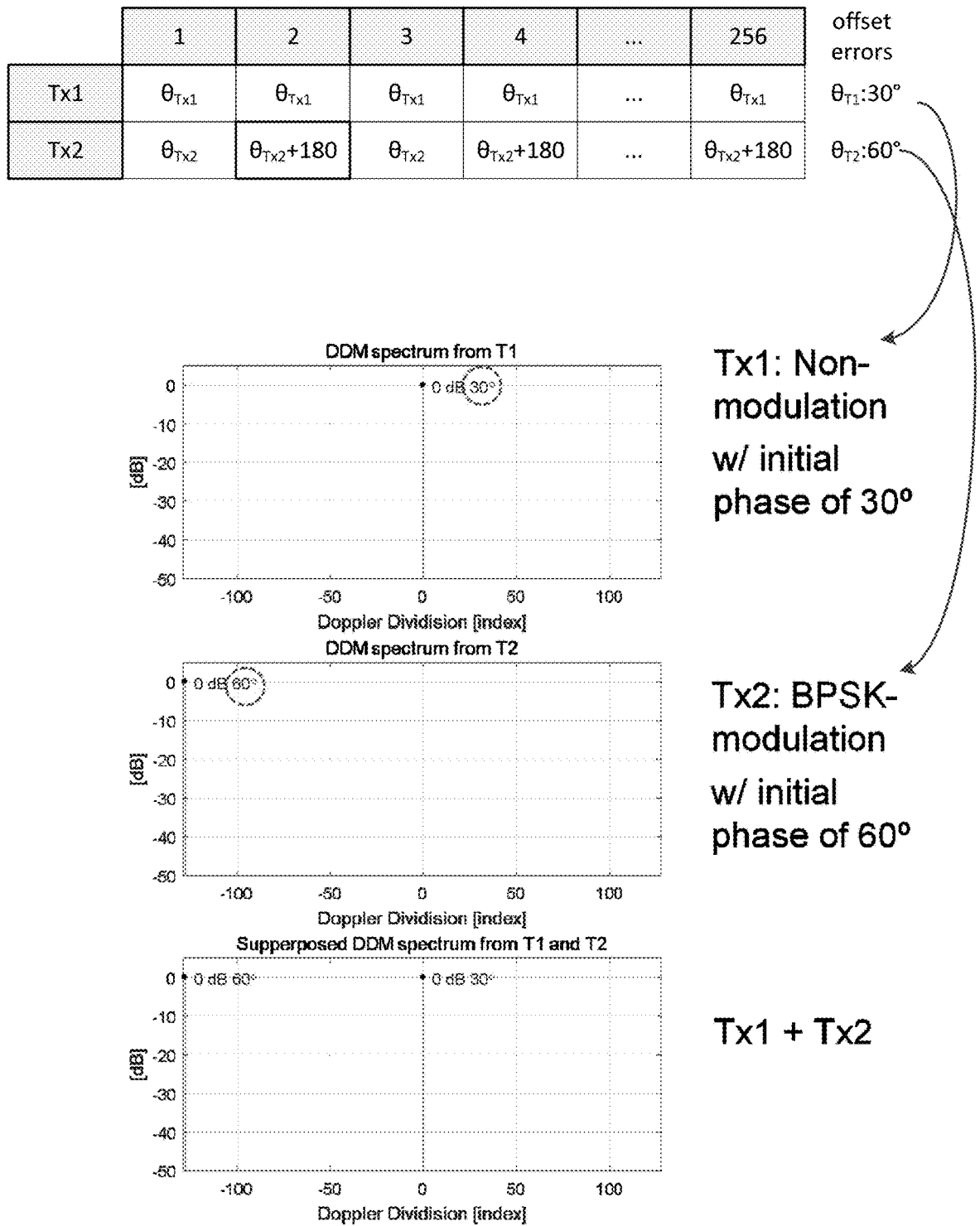

FIG. 4C illustrates a spectral distribution 400C of BPSK modulation with an initial offset phase, and a single target located at 0°. The first transmit channel Tx1 has an initial offset phase value $\theta_{T1}$ of 30°, and the second transmit channel Tx2 has an initial offset phase value $\theta_{T2}$ of 60°. An initial offset phase of phase modulation in the transmit channel Txi reflects on the corresponding Doppler bin with a same amount of phase value. The initial phase value $\theta_{Tx1}$ and the initial phase value $\theta_{Tx2}$ can be caused by the different feedline lengths to the antenna or the initial offset phase of transmit channels Tx1, Tx2. These constant phase offsets can be compensated using known end of line (EoL) calibration.

FIG. 4D illustrates a spectral distribution 400D of BPSK modulation with phase modulation error, and a single target located at 0°. The modulation error of 10° in BPSK resulting in 0°-170° modulation causes distortion in the fundamental signal component as well as generation of a spurious signal component. Furthermore, this spurious signal component is located at the same Doppler bin as that of the fundamental signal component of the unmodulated transmit channel Tx1. The level of spurious (leakage) component increases proportionally with a degree of the offset error.

FIG. 4E illustrates estimation of a reconstruction matrix 400E. $R_{Ti}$ represents a matrix of real fundamental signals associated with transmit channel Txi. $M_{Ti}$ represents a matrix of measured fundamental signals of Txi superposed by spurious components from the other transmit channels Txs. The reconstruction matrix RM includes $f_{Fii}$ and $f_{sij}$, which are complex coefficients that are functions of offset errors ($\theta_{Ex}$) and initial phase ($\theta_{Ti}$). The real fundamental signals $R_{Ti}$ are restored by multiplying the matrix of measured signals $M_{Ti}$ by the reconstruction matrix RM.

The reconstruction matrix RM in this example has four values. The first transmit channel Tx1 is represented in the first column, and the second transmit channel Tx2 is represented in the second column. The first diagonal ($f_{11}$ to $f_{21}$) from the upper left to the lower right represents fundamental signal components of the respective transmit signals Txi, which should be close to one (1) because most of the signal transmitted by the respective transmit channel Txi should be transmitted at its fundamental frequency. The opposite diagonal ($f_{12}$ to $f_{21}$), from the upper right to the lower left, represents leakage factors (spurs) of the respective transmit channel on the other transmit channel. More specifically, the upper left value $f_{11}$ represents the fundamental frequency component of the first transmit channel Tx1. The lower right value $f_{22}$ represents the fundamental frequency component of the second transmit channel Tx2. The upper right value $f_{12}$ represents leakage factor by the second transmit channel Tx2 on the first transmit channel Tx1. The lower left value $f_{21}$ represents leakage by the first transmit channel Tx1 on the second transmit channel Tx2. The value in the lower right is the fundamental frequency component of the second transmit channel Tx2, and since it is the transmit channel being tested, it will be very close to one (1). The value in the lower left is zero (0) because the first transmit channel Tx1 does not have any modulation and thus does not produce leakage on the second transmit channel Tx2. A perfect transmission would result in the reconstruction matrix having all 1s in the first diagonal and all 0s in the second diagonal.

Figure 4F:
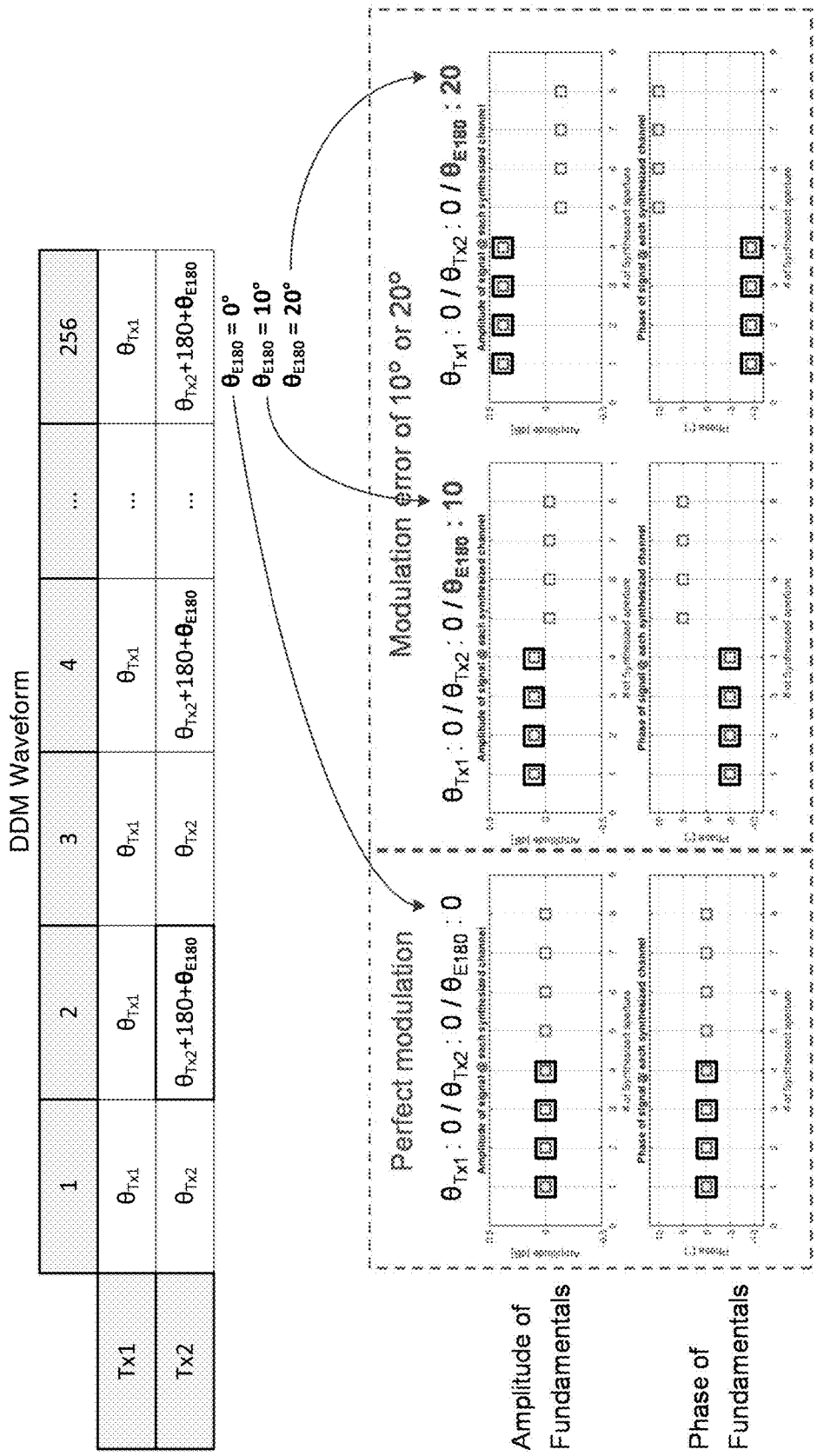
Figure 4G:
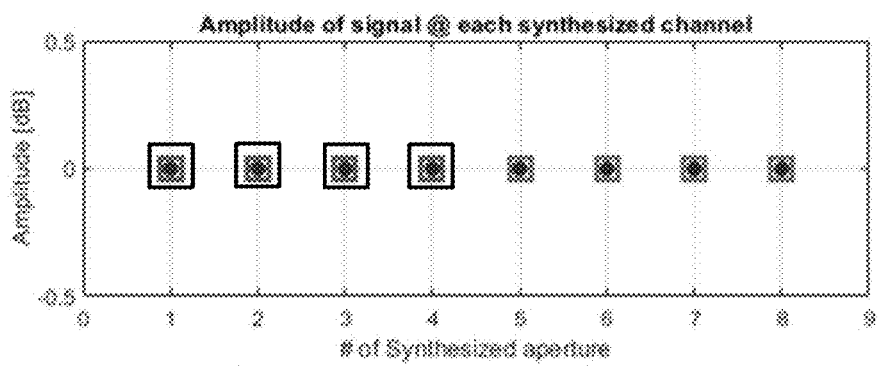
Figure 1:
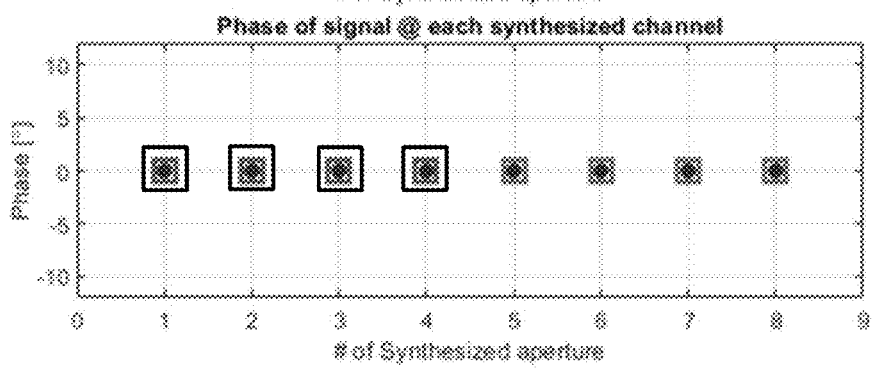
FIG. 1A illustrates a schematic diagram of a multiple-input multiple-output (MIMO) radar system during generation of a reconstruction matrix, with modulation errors estimated using monitoring circuitry, in accordance with aspects of the disclosure.
FIG. 1B illustrates a flowchart of the reconstruction matrix generation corresponding with FIG. 1A, in accordance with aspects of the disclosure.
Figure 4G:
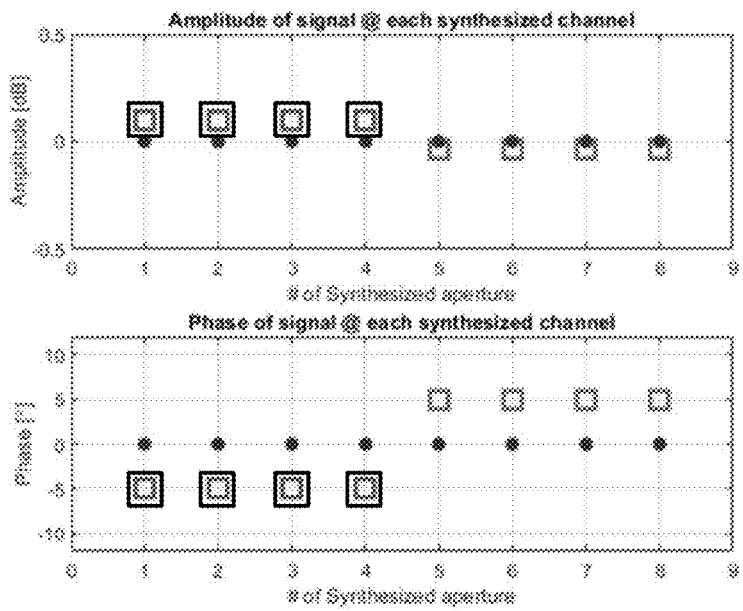
Figure 2:
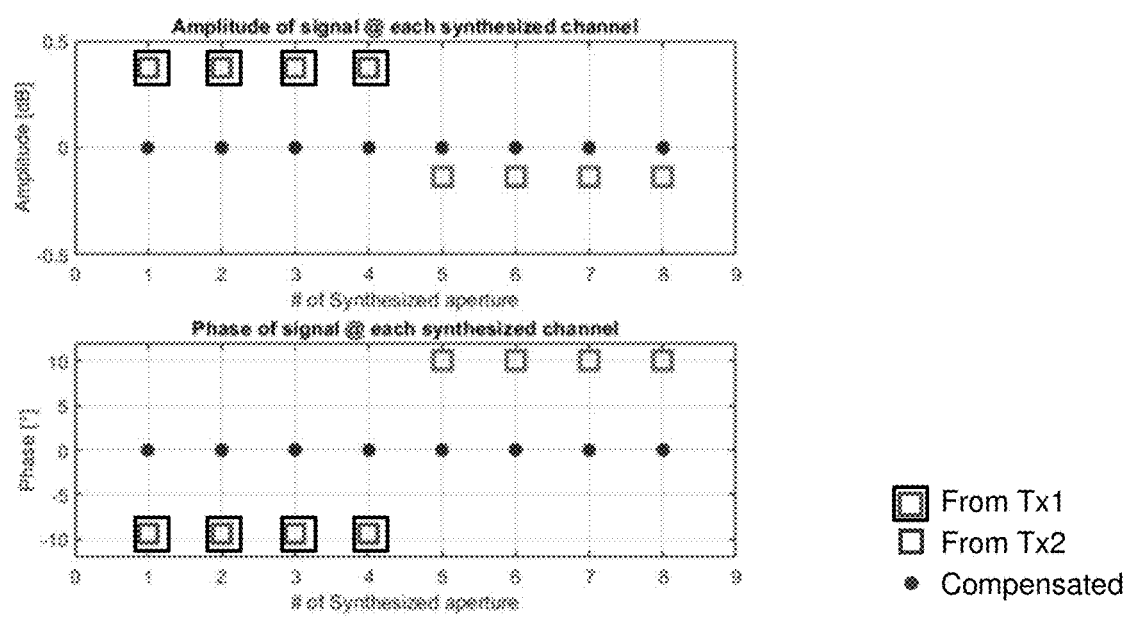

FIG. 4F illustrates a synthesized virtual array 400F before reconstruction, and FIGS. 4G-1 and 4G-2 illustrate a synthesized virtual array 400G after reconstruction 400G. The boxes represent amplitudes and phases of the fundamental signal components before reconstruction, with the double-boxes representing the first transmit channel Tx1, and the single box representing the second transmit channel Tx2. The dots added in FIGS. 4G-1 and 4G-2 represent amplitudes and phases of the fundamental signal components after reconstruction, with the boxes before reconstruction remaining for reference. As shown, if there is phase modulation error, the amplitudes and phases of the fundamental signal components from the virtual channels will not be all zero. In perfect modulation without phase modulation error, the amplitudes and phases of the fundamental signal components are all zeros.

The MIMO radar system of this disclosure is advantageous in many respects. The phase shifter does not need to be as accurate or balanced. Direct calibration is performed via software, so there is no need for hardware feedback control requiring multiple iterations to calibrate phase settings due to I/Q imbalance. Angle accuracy is improved by removing fundamental component errors when reconstructing MIMO snap shots to the original fundamental components without modulation coupling. And angle resolution is improved by decreasing side lobe levels.

Further, the reconstruction matrix RM is measured with a single transmit channel, and details how much of the transmitted signal by the second transmit channel interferes with the first transmit channel from phase modulation error due to hardware imperfections in the phase shifter. It is not necessary to measure every combination of signal on the first transmit channel Tx1 and the second transmit channel. Measuring with only a single transmit channel allows calibration for interference between the transmit channels.

The term "FFT" is inclusive of discrete Fourier transform (DFT) processing.

The term "processing circuitry" as, for example, used herein may be understood as any kind of technological entity that allows handling of data. The data may be handled according to one or more specific functions executed by the processor. Further, processing circuitry as used herein may be understood as any kind of processor or circuit, e.g., any kind of analog or digital circuit. Processing circuitry may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory.

The techniques of this disclosure may also be described in the following examples.

Example 1. A multiple-input multiple-output (MIMO) radar system, comprising: a plurality of transmit channels configured to sequentially transmit signals with transmit-channel-designated Doppler division multiplexing (DDM) modulations; and processing circuitry configured to: determine, for each of the transmit channels, an impulse response of phase modulation errors due to DDM coupling of the respective transmit channel from each of the other transmit channels; and generate, based on the impulse response, a reconstruction matrix of modulation DDM coupling factors.

Example 2. The MIMO radar system of example 1, wherein the processing circuitry is further configured to: estimate the phase modulation error for each of the transmit channels due to the DDM coupling of the respective transmit channel from each of the other transmit channels.

Example 3. The MIMO radar system of example 2, further comprising: a test signal generator configured to generate offset frequencies for the transmit signals, which have phase offsets sequentially corresponding with transmit-channel-designated DDM segments, wherein the processing circuitry is further configured to perform fast Fourier transform (FFT) processing over a fast time axis of the transmit signals coupled to a receive channel to determine relative measured phase offsets of the transmit signals.

Example 4. The MIMO radar system of example 3, wherein the processing circuitry is further configured to: determine the impulse response by performing FFT processing of a phase modulation vector for each of the respective transmit channels, wherein the phase modulation vector is based on an effective relative phase difference vector of DDM segments for the respective transmit channel.

Example 5. The MIMO radar system of example 1, wherein the transmit signals are single tone signals.

Example 6. The MIMO radar system of example 1, wherein the transmit signals are frequency modulated continuous wave (FMCW) signals.

Example 7. The MIMO radar system of example 1, wherein the processing circuitry is further configured to: measure the phase modulation error for each of the transmit channels due to the DDM coupling of the respective transmit channel from each of the other transmit channels.

Example 8. The MIMO radar system of example 7, wherein the processing circuitry is further configured to: determine the impulse response by performing a fast Fourier transform (FFT) processing of a phase modulation vector for each of the respective transmit channels, wherein the phase modulation vector is based on an actual relative phase difference vector of DDM segments for the respective transmit channel.

Example 9. The MIMO radar system of example 1, wherein the plurality of transmit channels are configured to be sequentially enabled one at a time while the other transmit channels are disabled, and the transmit signals are to be reflected by a predetermined target.

Example 10. The MIMO radar system of example 9, wherein the processing circuitry is further configured to: determine the impulse response for each of the transmit channels by performing a fast Fourier transform (FFT) processing over a slow time axis of the transmit signals reflected by the predetermined target; and generate the reconstruction matrix based on the result of the FFT processing.

Example 11. The MIMO radar system of example 1, wherein the processing circuitry is further configured to: synthesize a virtual aperture array based on the reconstruction matrix of modulation DDM coupling factors.

Example 12. The MIMO radar system of example 1, wherein the processing circuitry is further configured to: reconstruct a real matrix of fundamental signal components of the transmit signals by multiplying the reconstruction matrix by a measured matrix, wherein the measured matrix comprises measured fundamental signal components superposed by spurious components due to DDM modulation coupling between the transmit channels; and synthesize a virtual aperture array based on the reconstructed real matrix.

Example 13. The MIMO radar system of example 1, further comprising: at least two transmit channels, wherein the first transmit channel is unmodulated, and the second transmit channel is modulated with binary phase shift keying (BPSK) modulation.

Example 14. The MIMO radar system of example 13, further comprising: at least three transmit channels, wherein the third transmit channel is modulated with quadrature phase shift keying (QPSK) modulation.

Example 15. A multiple-input multiple-output (MIMO) radar processing method, comprising: a plurality of transmit channels sequentially transmitting signals with transmit-channel-designated Doppler division multiplexing (DDM) modulations; processing circuitry determining, for each of the transmit channels, an impulse response of phase modulation errors due to DDM coupling of the respective transmit channel from each of the other transmit channels; and the processing circuitry generating, based on the impulse response, a reconstruction matrix of modulation DDM coupling factors.

Example 16. The MIMO radar processing method of example 15, further comprising: the processing circuitry estimating the phase modulation error for each of the transmit channels due to the DDM coupling of the respective transmit channel from each of the other transmit channels.

Example 17. The MIMO radar processing method of example 16, further comprising: a test signal generator generating offset frequencies for the transmit signals, which have phase offsets sequentially corresponding with transmit-channel-designated DDM segments; and the processing circuitry performing fast Fourier transform (FFT) processing over a fast time axis of the transmit signals coupled to a receive channel to determine relative measured phase offsets of the transmit signals.

Example 18. The MIMO radar processing method of example 17, further comprising: the processing circuitry determining the impulse response by performing FFT processing of a phase modulation vector for each of the respective transmit channels, wherein the phase modulation vector is based on an effective relative phase difference vector of DDM segments for the respective transmit channel.

Example 19. The MIMO radar processing method of example 15, further comprising: the processing circuitry measuring the phase modulation error for each of the transmit channels due to the DDM coupling of the respective transmit channel from each of the other transmit channels.

Example 20. The MIMO radar processing method of example 19, further comprising: the processing circuitry determining the impulse response by performing fast Fourier transform (FFT) processing of a phase modulation vector for each of the respective transmit channels, wherein the phase modulation vector is based on an actual relative phase difference vector of DDM segments for the respective transmit channel.

Example 21. The MIMO radar processing method of example 15, wherein the plurality of transmit channels are configured to be sequentially enabled one at a time while the other transmit channels are disabled, and the transmit signals are to be reflected by a predetermined target.

Example 22. The MIMO radar processing method of example 21, further comprising: the processing circuitry determining the impulse response for each of the transmit channels by performing fast Fourier transform (FFT) processing over a slow time axis of the transmit signals reflected by the predetermined target; and the processing circuitry generating the reconstruction matrix based on the result of the FFT processing.

Example 23. The MIMO radar processing method of example 15, further comprising: the processing circuitry synthesizing a virtual aperture array based on the reconstruction matrix of modulation DDM coupling factors.

Example 24. The MIMO radar processing method of example 15, further comprising: the processing circuitry reconstructing a real matrix of fundamental signal components of the transmit signals by multiplying the reconstruction matrix by a measured matrix, wherein the measured matrix comprises measured fundamental signal components superposed by spurious components due to DDM modulation coupling between the transmit channels; and the processing circuitry synthesizing a virtual aperture array based on the reconstructed real matrix.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A multiple-input multiple-output (MIMO) radar system, comprising:
   a plurality of transmit channels configured to sequentially transmit signals with transmit-channel-designated Doppler division multiplexing (DDM) modulations; and
   processing circuitry configured to:
      determine, for each of the transmit channels, an impulse response of phase modulation errors due to DDM coupling of the respective transmit channel from each of the other transmit channels; and
      generate, based on the impulse response, a reconstruction matrix of modulation DDM coupling factors.

2. The MIMO radar system of claim 1, wherein the processing circuitry is further configured to:
   estimate the phase modulation error for each of the transmit channels due to the DDM coupling of the respective transmit channel from each of the other transmit channels.

3. The MIMO radar system of claim 2, further comprising:
   a test signal generator configured to generate offset frequencies for the transmit signals, which have phase offsets sequentially corresponding with transmit-channel-designated DDM segments,
   wherein the processing circuitry is further configured to perform fast Fourier transform (FFT) processing over a fast time axis of the transmit signals coupled to a receive channel to determine relative measured phase offsets of the transmit signals.

4. The MIMO radar system of claim 3, wherein the processing circuitry is further configured to:
   determine the impulse response by performing FFT processing of a phase modulation vector for each of the respective transmit channels, wherein the phase modulation vector is based on an effective relative phase difference vector of DDM segments for the respective transmit channel.

5. The MIMO radar system of claim 1, wherein the transmit signals are single tone signals.

6. The MIMO radar system of claim 1, wherein the transmit signals are frequency modulated continuous wave (FMCW) signals.

7. The MIMO radar system of claim 1, wherein the processing circuitry is further configured to:

measure the phase modulation error for each of the transmit channels due to the DDM coupling of the respective transmit channel from each of the other transmit channels.

8. The MIMO radar system of claim 7, wherein the processing circuitry is further configured to:
determine the impulse response by performing fast Fourier transform (FFT) processing of a phase modulation vector for each of the respective transmit channels, wherein the phase modulation vector is based on an actual relative phase difference vector of DDM segments for the respective transmit channel.

9. The MIMO radar system of claim 1, wherein the plurality of transmit channels are configured to be sequentially enabled one at a time while the other transmit channels are disabled, and the transmit signals are to be reflected by a predetermined target.

10. The MIMO radar system of claim 9, wherein the processing circuitry is further configured to:
determine the impulse response for each of the transmit channels by performing fast Fourier transform (FFT) processing over a slow time axis of the transmit signals reflected by the predetermined target; and
generate the reconstruction matrix based on the result of the FFT processing.

11. The MIMO radar system of claim 1, wherein the processing circuitry is further configured to:
synthesize a virtual aperture array based on the reconstruction matrix of modulation DDM coupling factors.

12. The MIMO radar system of claim 1, wherein the processing circuitry is further configured to:
reconstruct a real matrix of fundamental signal components of the transmit signals by multiplying the reconstruction matrix by a measured matrix, wherein the measured matrix comprises measured fundamental signal components superposed by spurious components due to DDM modulation coupling between the transmit channels; and
synthesize a virtual aperture array based on the reconstructed real matrix.

13. The MIMO radar system of claim 1, further comprising:
at least two transmit channels, wherein the first transmit channel is unmodulated, and the second transmit channel is modulated with binary phase shift keying (BPSK) modulation.

14. The MIMO radar system of claim 13, further comprising:
at least three transmit channels, wherein the third transmit channel is modulated with quadrature phase shift keying (QPSK) modulation.

15. A multiple-input multiple-output (MIMO) radar processing method, comprising:
a plurality of transmit channels sequentially transmitting signals with transmit-channel-designated Doppler division multiplexing (DDM) modulations;
processing circuitry determining, for each of the transmit channels, an impulse response of phase modulation errors due to DDM coupling of the respective transmit channel from each of the other transmit channels; and
the processing circuitry generating, based on the impulse response, a reconstruction matrix of modulation DDM coupling factors.

16. The MIMO radar processing method of claim 15, further comprising:
the processing circuitry estimating the phase modulation error for each of the transmit channels due to the DDM coupling of the respective transmit channel from each of the other transmit channels.

17. The MIMO radar processing method of claim 16, further comprising:
a test signal generator generating offset frequencies for the transmit signals, which have phase offsets sequentially corresponding with transmit-channel-designated DDM segments; and
the processing circuitry performing fast Fourier transform (FFT) processing over a fast time axis of the transmit signals coupled to a receive channel to determine relative measured phase offsets of the transmit signals.

18. The MIMO radar processing method of claim 17, further comprising:
the processing circuitry determining the impulse response by performing FFT processing of a phase modulation vector for each of the respective transmit channels, wherein the phase modulation vector is based on an effective relative phase difference vector of DDM segments for the respective transmit channel.

19. The MIMO radar processing method of claim 15, further comprising:
the processing circuitry measuring the phase modulation error for each of the transmit channels due to the DDM coupling of the respective transmit channel from each of the other transmit channels.

20. The MIMO radar processing method of claim 19, further comprising:
the processing circuitry determining the impulse response by performing fast Fourier transform (FFT) processing of a phase modulation vector for each of the respective transmit channels, wherein the phase modulation vector is based on an actual relative phase difference vector of DDM segments for the respective transmit channel.

21. The MIMO radar processing method of claim 15, wherein the plurality of transmit channels are configured to be sequentially enabled one at a time while the other transmit channels are disabled, and the transmit signals are to be reflected by a predetermined target.

22. The MIMO radar processing method of claim 21, further comprising:
the processing circuitry determining the impulse response for each of the transmit channels by performing fast Fourier transform (FFT) processing over a slow time axis of the transmit signals reflected by the predetermined target; and
the processing circuitry generating the reconstruction matrix based on the result of the FFT processing.

23. The MIMO radar processing method of claim 15, further comprising:
the processing circuitry synthesizing a virtual aperture array based on the reconstruction matrix of modulation DDM coupling factors.

24. The MIMO radar processing method of claim 15, further comprising:
the processing circuitry reconstructing a real matrix of fundamental signal components of the transmit signals by multiplying the reconstruction matrix by a measured matrix, wherein the measured matrix comprises measured fundamental signal components superposed by spurious components due to DDM modulation coupling between the transmit channels; and
the processing circuitry synthesizing a virtual aperture array based on the reconstructed real matrix.

* * * * *